Oct. 21, 1958 — G. A. LYON — 2,857,211
WHEEL COVER
Original Filed Oct. 12, 1953
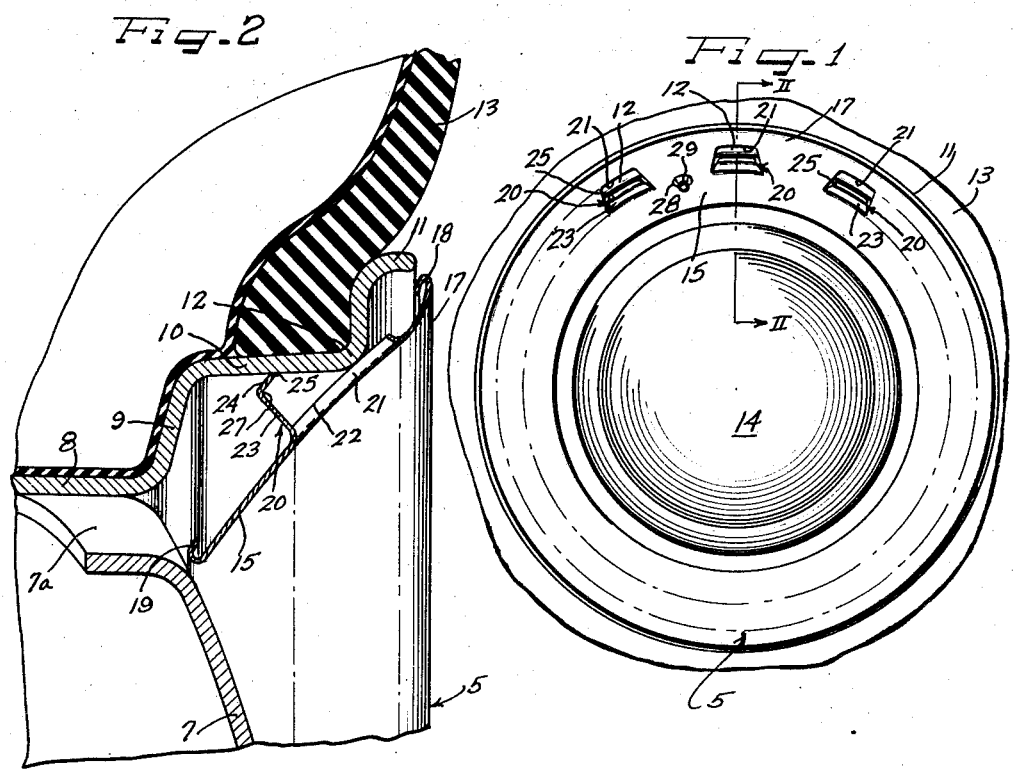
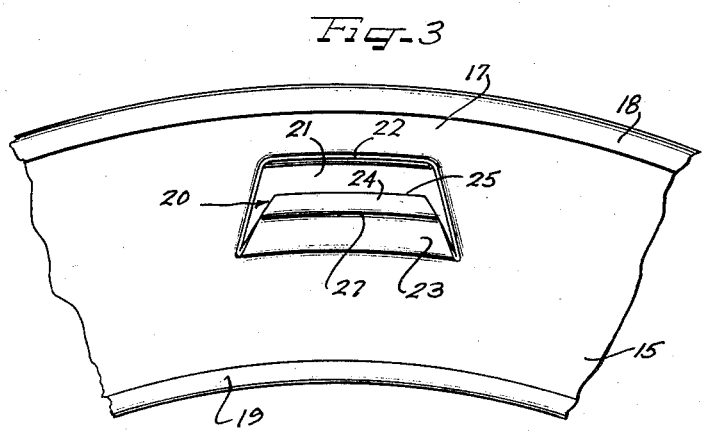
Inventor
GEORGE ALBERT LYON United States Patent Office 2,857,211

Patented Oct. 21, 1958

2,857,211

WHEEL COVER

George Albert Lyon, Detroit, Mich.

Original application October 12, 1953, Serial No. 385,472, now Patent No. 2,779,632, dated January 29, 1957. Divided and this application December 7, 1956, Serial No. 627,063

10 Claims. (Cl. 301—37)

The present invention relates to improvements in the ornamental and protective covering of the outer sides of vehicle wheels and more particularly concerns a new and improved wheel cover for such wheels.

The present invention is a division of my application Serial No. 385,472 filed October 12, 1953, now Patent No. 2,779,632 issued January 29, 1957.

An important object of the present invention is to provide in a wheel structure an improved self-retaining cover which is provided not only with self-retaining fingers for gripping a wheel flange but also with improved means for not only maintaining the axial disposition of the cover but also for assisting in maintaining the cover against turning on the wheel.

Another object of the invention is to provide an improved trim ring construction having improved means for retaining engagement with a tire rim.

A further object of the invention is to provide a wheel cover for disposition at the outer side of a vehicle wheel and provided with air circulation openings having cover retaining fingers so located therebehind for retaining engagement with a wheel flange that they function to minimize the apparent size of the openings although the openings are actually of fairly large dimensions.

Still another object of the invention is to provide improved means for holding a wheel cover member against turning relative to a wheel and thereby avoiding distortion of a valve stem that may project through the cover member.

Yet another object of the invention is to provide a press-on, pry-off wheel cover having improved pry-off shoulder means.

A still further object of the invention is to provide in a wheel structure an improved cover for disposition thereover having novel means for affording air circulation and dirt and water escape from behind the cover.

Other objects, features and advantages of the present invention will be readily apparent from the following detailed description of a preferred embodiment thereof taken in conjunction with the accompanying drawing, in which:

Figure 1 is an outer side face elevational view of a wheel structure embodying features of the invention;

Figure 2 is an enlarged fragmentary radial sectional detail view taken substantially on the line II—II of Figure 1; and Figure 3 is a fragmentary rear elevational view of the cover member of the present invention.

According to the present invention, the cover member 5 is constructed and arranged to be applied to the outer side of a vehicle wheel including a wheel body 7 which may be of the disk spider type marginally attached to a drop center multi-flanged tire rim including a base flange 8 between which and the periphery of the wheel body is preferably provided a series of circumferentially spaced wheel openings *7a*, sometimes referred to as chain slots, but through which air is adapted to circulate in the operation of the wheel for assisting in cooling the brake structure and more particularly means behind the wheel such as a brake drum (not shown). Extending generally radially outwardly and facing axially outwardly from the axially outer side of the base flange 8 is a side flange 9 that merges with a generally axially outwardly extending and radially inwardly facing oblique intermediate flange 10 joining at its axially outer side a generally radially outwardly and then axially outwardly turned terminal flange 11, at juncture with which is a shoulder 12 which it will be observed is offset generally radially and axially outwardly relative to the juncture between the wheel body and the tire rim, and more particularly with respect to the wheel openings *7a*. A suitable pneumatic tire 13 which as shown is of the tire and tube assembly type, but which may as well be a tubeless tire, is adapted to be carried by the tire rim.

In the present instance, the cover member 5 is shown as being in the form of an annulus or trim ring for overlying the tire rim and the adjacent portion of the wheel body 7 and more particularly the portion having the wheel openings *7a* therein. On the other hand, it will be appreciated that at least in its major respects the cover 5 could be a full disk cover, that is one that would cover the entire wheel including the wheel body and the tire rim. Where the cover 5 is in the form of a trim ring, it may be accompanied on the wheel by a central cover member or hub cap 14 which overlies at least the central portion of the wheel body 7 but may be constructed and arranged to extend to within a predetermined spaced relation to the inner margin of the cover member 5, as best seen in Figure 1.

The cover member 5 may be made from suitable sheet material such as steel sheet or strip and more particularly stainless steel, although suitable brass sheet may also be used. It lends itself readily to inexpensive mass production methods of manufacture such as rolling or press equipment. Furthermore, the cover member 5 may be economically provided with a suitable external finish and where it is made from a material such as stainless steel, it can economically be provided with a highly lustrous external finish by simple buffing operations. Brass lends itself readily to a highly lustrous polishing and then plating treatment.

Herein the cover member 5 comprises an annular portion 15 having a radially outer axially outwardly convex reinforcing rib marginal portion 17 with an underturned reinforcing and finishing flange 18 providing a reinforced radially outer extremity edge which in assembly with the wheel is adapted to be disposed adjacent to the tip of the terminal flange 11. From the reinforcing margin 17 the main body portion 15 of the trim cover member extends generally radially and axially inwardly obliquely but preferably slightly concavely with respect to its axially outer side, so that in the assembly with the wheel the outer marginal portion 17 can overlie the terminal flange 11 while the inner extremity of the body portion 15 lies over the wheel body 7 closely adjacent to the radially inner sides of the wheel openings *7a* so as to be in substantial concealing relation to such wheel openings. An underturned reinforcing and finishing flange 19 provides a sturdy finished inner edge for the trim ring 5.

For retaining the cover member 5 in press-on, pry-off relation on the wheel, a series of retaining fingers 20 is provided thereon in an annular intermediate portion of the cover body and such retaining fingers are preferably derived integrally in one piece with the cover body 15 from material derived by striking the same from respective openings 21 through the cover and disposed in an annular circumferentially spaced series. In the present instance, the openings 21 in the cover are provided at juncture of the oblique portion of the cover body 15 with the outer annular marginal portion 17 and the location of the openings is such that in the radially outer portions thereof they overlie the terminal flange 11 while in the radially inner portions thereof they overlie the intermediate flange 10 and extend substantially radially and axially inwardly therefrom so as to be opposite the side flange 9 in the portion of the cover member 15 that generally telescopically opposes the intermediate flange 10 in substantial diverging relation thereto.

As best seen in Figures 1 and 3, the cover openings 21 are preferably of generally wedge shape and of substantial width between generally radially outwardly converging side edges defining the openings, being defined entirely around the edge of the opening by a narrow generally axially inwardly directed reinforcing flange 22.

From the radially inner sides or edges defining each of the openings 21, and more particularly as integral one piece extensions from the reinforcing flange 22 defining the radially inner side of each opening, the respective retaining finger or clip 20 extends as material deflected from the respective opening 21. Each of the fingers 20 includes a generally axially inwardly and radially outwardly oblique body leg 23 terminating in a substantially shorter generally radially and axially outwardly oblique retaining terminal leg or flange 24 that has a generally radially and axially outwardly projecting rim flange gripping, retaining edge 25 normally projecting to a diameter slightly greater than the diameter of the inner face of the intermediate flange 10 to be engaged thereby. It will be observed, especially from Figure 3, that the radially inner portion of the reinforcing flange 22 is of arcuate shape, that is bowed radially outwardly, and that such inner portion is the longest portion since it is at the widest portion of the opening 21 and thereby provides maximum width for the retaining finger leg 23 where it joins and is in common with the reinforcing flange, that is the full maximum width of the opening 21 at its radially inner side. From the base juncture of the finger leg 23 with the cover member, it extends with the sides converging toward a reinforcing, stiffening juncture rib 27 with the terminal flange 24, and such rib is also preferably arcuately shaped, generally like the reinforcing flange juncture of the finger leg 23. Through this arrangement, it will be appreciated that the retaining finger body or leg portions 23 are of substantial resilient stiffness, inclusive of the juncture ribs 27. Since the retaining terminal flanges 24 are substantially shorter than the body leg portions 23 and are several times as wide as long and joined to the body leg portions 23 on the stiff bowed reinforcing rib 27, the retaining terminal flanges 24 are substantially stiffer than the body leg portions 23. The resilient stiffness of the retaining finger body leg portions 23 and the stiffness of the terminal flange portions 24 afford substantial advantages and efficiency in retaining the cover on the wheel.

In applying the cover member 5 to the outer side of the wheel, a valve stem aperture 28, preferably provided between a pair of the cover openings 21, is registered with a valve stem 29 that projects as is customary from the side flange 9 of the tire rim. Then the wheel cover member 5 is pressed axially inwardly so that the retaining finger edges 25 will cam generally axially and radially inwardly along the inclined rim flange 10. This resiliently stresses or tensions the retaining finger bodies 23 and thus provides strong tensioned thrust of the retaining terminal edges 25 into generally biting gripping relation against the inner face of the rim flange 10. A desirable factor in such gripping thrust resides in the more radially extending than axially extending disposition of the retaining finger legs 23 so that a highly advantageous thrust effort on the longitudinal axis of the retaining finger leg 23 is attained as well as the resiliently radially deflectional thrust force generated in the retaining engagement of the fingers with the rim flange.

Herein, the side portions of the reinforcing flanges 22 defining the respective openings 21 are utilized as axially inward positioning stops for the cover member 5, and also to serve as turn preventing means. Since there are a substantial number of the openings 21, in the present instance from 12 to 15, depending upon the size of the wheel for which the cover is provided, there are twice as many points of contact of the flange 22 with the shoulder 12 as there are openings and thus high percentage contact of stop preventing edges with the rim shoulder. This not only assures good turn preventing engagement with the rim shoulder 12 but also stability of stop engagement. Furthermore, since engagement by the stop flanges 22 with the rim shoulder 12 is in general alignment with the engagement of the retaining finger edges 25 with the intermediate flange 10, there is minimum tendency for undesirable twisting or canting or distortion that might disturb the cover retaining relationship of the retaining fingers 20 responsive to extraneous forces or pressures that may be imposed upon the cover member 5 in service.

By having the cover opening flanges 22 serve as axial stops for the cover, spaced relationship of both the radially inner and outer edge extremity portions of the cover relative to the wheel is enabled. At the radially inner side of the cover this is advantageous since thereby the cover is supported free from the wheel body 7 and thus no interference from extreme manufacturing tolerance relative axial positioning of the wheel body and tire rim need be taken into account, because the cover is entirely supported by the tire rim. At the radially outer side of the cover it is advantageous to have the extremity at least slightly spaced from the tip of the tire rim terminal flange 11 so as to accommodate freely the usual clips of wheel balancing weights that are adapted to be concealably housed within the chamber defined between the terminal flange 11 and the cover marginal portion 17. Additionally, it is desirable to have the radially outer marginal extremity of the cover member spaced from the tire rim to enable free escape of dirt or water that may get in behind the cover during service. In fact, the spaced relation of the cover body 15 between the cover openings 21 maintained by the stop flanges 17 in engagement with the rim shoulder 12, enables centrifugal or gravity discharge of dirt or water that may some how get into the chamber or passage defined behind the cover body portion 15 and otherwise defined by the side flange 9 and the intermediate flange 10 of the tire rim.

In addition, the spaced relationship maintained between the tire rim and the body portion 15 of the cover member facilitates air circulation behind the cover and outwardly past the rim shoulder 12 and then out past the underturned cover flange 18. Such air circulation behind the cover is supplemental to air circulation that may occur through the wheel cover openings 21 which afford communication externally of the cover from the chamber behind the cover body 15 and with which the wheel openings 7a communicate. It will be noticed that the radially inner portion of the cover body 15 serves as a baffle cooperative with the radially inner sides of the wheel openings 7a to direct flow of air toward the cover openings 21 and the space gap passage between the cover and the tire rim shoulder 12.

While leaving the cover openings 21 unobstructed, it will be observed that by virtue of the fact that the openings are in an inclined portion of the cover, and the retaining fingers 20 extend generally radially outwardly axially inwardly of the openings, to underlie the openings they provide what from the outer side of the cover appear as partial closures especially between the cover openings 21 and the relatively deep chamber defined with the rim flanges 9 and 10 behind the cover and which would otherwise appear as more or less dark space behind the cover through the openings. The small areas of the tire rim shoulder 12 that are exposed through the cover openings 21 are decoratively harmonious with the portion of the wheel body 7 exposed between the edge of the hub cap 14 and the inner edge of the cover 5.

By having the cover openings 21 extending across the tire rim shoulder 12 so that the portions of the cover opening-defining flanges 22 are located axially and radially outwardly from the rim shoulder, yet another advantage is attained in that the radially outer portions of the inturned reinforcing flange 22 defining any one of the openings 21 is adapted to serve as a secondary pry-off shoulder. This is useful, after a pry-off tool such as a screwdriver has been inserted behind the turned outer edge flange 18 of the cover to afford initial pry-off leverage, when the tip of the pry-off tool can be engaged behind the adjacent portion of the opening defining flange 22 and further pry-off leverage force applied to dislodge the cover from the wheel by causing the engagement tips of the retaining fingers to slide axially outwardly from the engaged relationship thereof with the intermediate rim flange 10. During the imposition of pry-off leverage, the resiliency of the retaining finger legs 23 enables at least slight radial displacement of the cover member toward the opposite side of the wheel to thereby slightly relieve the retaining finger or fingers nearest the application of pry-off force due to the backing off thus accomplished. Furthermore, the angle of the retaining finger legs 23 enhances the retaining finger disengagement in response to pry-off force since there is then a generally radially inwardly and axially outward pull of the retaining finger legs 23 relative to the retaining terminal flanges 24 thereof away from the engaged surface of the intermediate flange 10.

Of course, if preferred, and after the hub cap 14 has been removed from the wheel, a pry-off tool may be applied behind the radially inner underturned flange 19 of the ring cover member 5 to apply pry-off force to the cover. However, generally this is not as convenient as the application of pry-off force from the radially outer side of the cover.

It will be understood that modifications and variations may be effected without departing from the scope of the novel concepts of the present invention.

I claim as my invention:

1. In a wheel structure including a tire rim having a generally radially inwardly facing flange with a shoulder located axially outwardly in relation thereto, a cover for disposition at the outer side of the wheel including an annular series of spaced openings in that portion which overlies said flange, and a series of cover retaining fingers deflected from said openings and extending from the radially inner sides thereof generally radially outwardly in underlying relation to the respective opening and having a retaining terminal retainingly engageable with the radially facing rim flange, said openings overlying said rim shoulder and being provided with side flanges engageable with the rim shoulder.

2. In a wheel structure including a tire rim having a generally radially inwardly facing flange with a shoulder located axially outwardly in relation thereto, a cover for disposition at the outer side of the wheel including an annular series of spaced openings in that portion which overlies said flange, and a series of cover retaining fingers deflected from said openings and extending from the radially inner sides thereof generally radially outwardly in underlying relation to the respective opening and having a retaining terminal retainingly engageable with the radially facing rim flange, said retaining fingers being of angular form having generally radially outwardly and axially inwardly extending resilient legs with the terminals comprising angularly related short and stiff generally radially and axially outwardly extending terminal flanges having tips thereon grippingly retainingly engageable with the rim flange under resilient tensioned thrust of the finger legs.

3. In a wheel structure including a generally radially inwardly facing rim flange having a shoulder disposed axially outwardly therefrom, a cover for disposition at the outer side of the wheel including a series of circumferentially spaced openings therethrough for overlying the rim shoulder and said flange and with the openings defined by continuous axially inwardly directed flanges thereabout, the radially inner portions of said flanges having as integral extensions therefrom and comprising material derived from the openings retaining fingers extending generally radially and axially outwardly behind the openings and engageable retainingly with the rim flange, said opening defining flanges having side portions engageable as spacer stops against said rim shoulder.

4. In a wheel structure including a generally radially inwardly facing rim flange having a shoulder disposed axially outwardly therefrom, a cover for disposition at the outer side of the wheel including a series of circumferentially spaced openings therethrough for overlying the rim shoulder and said flange and with the openings defined by continuous axially inwardly directed flanges thereabout, the radially inner portions of said flanges having as integral extensions therefrom and comprising material derived from the openings retaining fingers extending generally radially and axially outwardly behind the openings and engageable retainingly with the rim flange, said opening defining flanges having side portions engageable as spacer stops against said rim shoulder, said opening-defining flanges having radially outer portions thereof offset radially and axially outwardly relative to said rim shoulder and serving as a pry-off shoulder.

5. In a wheel structure including a generally radially inwardly facing rim flange having a shoulder disposed axially outwardly therefrom, a cover for disposition at the outer side of the wheel including a series of circumferentially spaced openings therethrough for overlying the rim shoulder and said flange and with the openings defined by continuous axially inwardly directed flanges thereabout, the radially inner portions of said flanges having as integral extensions therefrom and comprising material derived from the openings retaining fingers extending generally radially and axially outwardly behind the openings and engageable retainingly with the rim flange, said opening defining flanges having side portions engageable as spacer stops against said rim shoulder, said opening-defining flanges having radially outer portions thereof offset radially and axially outwardly relative to said rim shoulder and serving as a pry-off shoulder, the cover having generally radially outwardly spaced from said flange pry-off shoulder a primary reinforced edge pry-off shoulder.

6. In a wheel structure including a tire rim having an intermediate flange and a terminal flange with a juncture shoulder therebetween, a cover for disposition at the outer side of the wheel and comprising a portion for overlying the tire rim including said intermediate and terminal flanges, the cover having an outer marginal portion for defining with the terminal flange a wheel weight chamber and radially inwardly adjacent to said outer marginal portion a circumferential series of spaced openings for overlying said rim shoulder and said intermediate flange and having generally axially inwardly turned reinforcing flanges at the openings engageable against said rim shoulder as axially inward stops, with cover retaining means behind the cover engageable with the intermediate flange for retaining the cover on the wheel.

7. In a wheel structure including a tire rim and a wheel body having openings adjacent juncture with the tire rim, a cover for disposition at the outer side of the wheel comprising a circular cover member inclined generally axially and radially inwardly and dimensioned to overlie the tire rim and having an inner edge of a diameter to overlie the wheel body adjacent the radially inner sides of the wheel openings, the cover having air circulation openings therethrough spaced substantially from said radially inner edge and the intervening body portion of the cover serving as a baffle for directing air passage between the wheel and cover openings, said cover openings being disposed to overlie a generally radially inwardly facing rim flange and having pressed therefrom and extending from the radially inner sides thereof generally radially outwardly and axially inwardly cover retaining fingers for retaining engagement with said rim flange.

8. In a cover for disposition at the outer side of a vehicle wheel, a circular cover member comprising an annular radially and axially inclined portion for generally telescoping divergent relation to a radially facing wheel flange, said cover member having an annular series of apertures therethrough defined by entirely circumscribing generally axially inwardly directed reinforcing flanges about the openings, said flanges having at the axially innermost portions of the openings integral finger extensions that project generally axially inwardly and radially across the openings and have retaining terminals at their free ends for retaining engagement with the wheel flange and with the retaining fingers affording the appearance of at least partially closing the openings and concealing the portions of the wheel behind the retaining fingers.

9. In a cover for disposition over a vehicle wheel having a radially facing annular flange structure, a cover member including an inclined annular portion with a circumferentially spaced series of openings which are substantially wider than long and of generally wedge shape with sides converging from greatest width at the radially innermost portions of the openings, said radially innermost portions of the openings having as integral one piece extensions therefrom retaining fingers of material deflected from the openings and provided with resilient legs joined to the cover at the openings and having short terminal flanges angled relative thereto and joining the same on reinforcing rib juncture, said reinforcing rib juncture and the juncture of the fingers with the cover being on arcuate reinforcing curvature whereby to afford substantial resilient stiffness in said finger legs, said finger legs projecting across said openings for engagement with the cover flange structure over which the openings are adapted to be disposed.

10. In a wheel structure including a generally radially facing annular flange and a generally axially outwardly facing annular shoulder, a cover for disposition over the outer side of the wheel including cover retaining means for engagement in press-on, pry-off relation with said radially facing flange, the cover including an annular portion for overlying said axially outwardly facing annular shoulder, said annular cover portion having a circumferential series of openings therethrough, said openings being defined by circumferential side flanges directed axially inwardly toward said wheel shoulder and having axially inner edges engaging said wheel shoulder and thereby supporting said annular portion of the cover in spaced relation to said wheel shoulder, said opening flange edges generally bitingly engaging said shoulder and thereby holding the cover against turning on the wheel, said wheel shoulder being of angular cross-section and projecting generally toward the outer side of the wheel and toward the annular portion of the cover and said cover openings extending across the wheel shoulder with said cover opening flanges engaging upon the crest portion of the wheel shoulder with enhanced biting effect due to limited points of engagement with the wheel shoulder crest.

References Cited in the file of this patent

UNITED STATES PATENTS

| | | |
|---|---|---|
| Re. 22,042 | Lyon | Mar. 3, 1942 |
| 1,948,273 | Lyon | Feb. 20, 1934 |
| 2,198,056 | Lyon | Apr. 23, 1940 |
| 2,368,228 | Lyon | Jan. 30, 1945 |
| 2,368,237 | Lyon | Jan. 30, 1945 |
| 2,368,238 | Lyon | Jan. 30, 1945 |
| 2,633,944 | Butterfield | Apr. 7, 1953 |